United States Patent

[11] 3,590,348

| [72] | Inventor | John P. Bertics<br>Erie, Pa. |
|---|---|---|
| [21] | Appl. No. | 888,429 |
| [22] | Filed | Dec. 29, 1969 |
| [45] | Patented | June 29, 1971 |
| [73] | Assignee | Erie Technological Products, Inc.<br>Erie, Pa. |

[54] RADIAL LEAD CERAMIC CAPACITOR WITH INTEGRAL STANDOFF FEET
4 Claims, 4 Drawing Figs.

[52] U.S. Cl. ............................................. 317/261,
317/101, 317/258
[51] Int. Cl. ........................................... H01g 1/00
[50] Field of Search............................................ 317/101,
101 CC, 258, 261; 174/138.5

[56] References Cited
UNITED STATES PATENTS

| 3,223,905 | 12/1965 | Fabricius..................... | 317/261 X |
| 3,310,718 | 3/1967 | Lupfer......................... | 317/258 |
| 3,439,233 | 4/1969 | Braiman et al............ | 317/101 CC (UX) |
| 3,492,536 | 1/1970 | Girolamo et al. ......... | 317/101 CC (UX) |

FOREIGN PATENTS

| 1,117,437 | 6/1968 | Great Britain............... | 174/138.5 (UX) |

*Primary Examiner*—David Smith, Jr.
*Attorney*—Ralph Hammar

ABSTRACT: Ceramic disc capacitors for printed circuit boards having radial leads in the plane of the disc and integral standoff feet between the leads.

PATENTED JUN29 1971

3,590,348

INVENTOR
John P Bertics
BY Ralph Hammar
ATTORNEY

RADIAL LEAD CERAMIC CAPACITOR WITH INTEGRAL STANDOFF FEET

This invention is intended to improve the reliability, increase the volumetric efficiency, and decrease the cost of radial lead ceramic capacitors for printed circuit boards by integral ceramic standoff feet between the leads.

Figure 1:
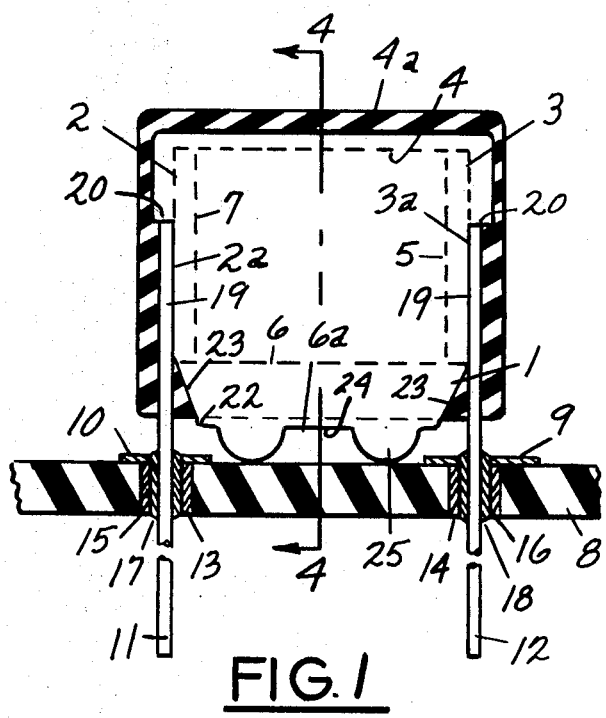
Figure 4:
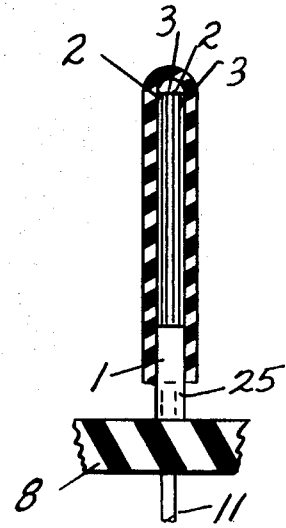
Figure 2:
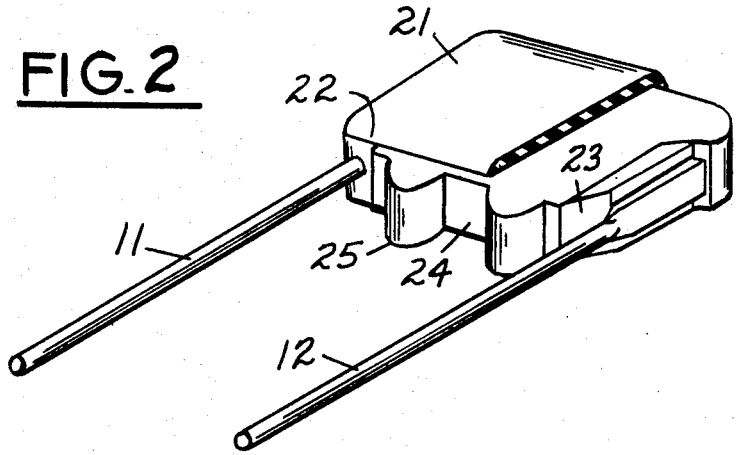
Figure 3:
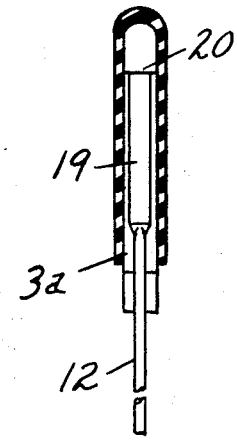

In the drawing, FIG. 1 is a front elevation, partly broken away, of a disc ceramic capacitor mounted on a printed circuit board; FIG. 2 is a perspective of the capacitor; FIG. 3 is an edge view of the FIG. 2 capacitor; and FIG. 4 is a section on line 4-4 of FIG. 1.

The capacitor has a monolithic ceramic body 1 comprising a plurality of layers of green ceramic sintered or fused into an integral unitary ceramic body. Interleaved between the layers of green ceramic are alternating electrodes 2 and 3 respectively extending to opposite edges of the body. The electrodes are preferably applied to the layers of green ceramic in the form of a paint of a metal capable of withstanding the ceramic in the form of a paint of a metal capable of withstanding the ceramic firing temperatures. For ceramics of the titanate family requiring high firing temperatures, the metal paints could be of the platinum-palladium family. The electrodes 2 which extend to the left-hand edge 2a of the body as shown in FIG. 1 are margined from the other edges 3a, 4a, 6a of the body as indicated by dotted lines 4, 5, 6 in FIG. 1. Similarly, the electrodes 3 which extend to the right-hand edge 3a of the body are margined from the other edges of the body as shown by dotted lines 4, 7, 6 in FIG. 1. The margins 6, 6a are wide enough so the fused ceramic provides protection against moisture in the absence of any supplemental insulating coating. The ceramic body is of generally rectangular shape with the top and bottom and side edges 2a, 3a, 4a, 6a extending between the front and back faces of the body.

The capacitor is mounted on a printed circuit board 8 having on one face of the board circuit patterns 9, 10 to be connected to capacitor leads 11, 12. For this purpose the board is provided with holes 13, 14 intersecting the circuit patterns 9, 10. The holes have metal coatings 15, 16 and the connections are made by dip soldering, resulting in solder masses 17, 18, making electrical connections between the leads and the circuit patterns. It is imperative that the leads 11, 12 be free of insulating coatings in the regions of the solder masses 17, 18.

The leads 11, 12 as shown in FIG. 3, have identical flattened ends 19 abutting against the shoulders 20 on the ceramic. The flattened end 19 on the lead 11 abuts and is soldered to the edges 2a. In a similar manner the flattened end 19 on the lead 12 abuts and is soldered to the edges 3a. The shoulders 20 accurately position the leads. Prior to soldering, the edges 2a and 3a are provided with a silver or equivalent coating which make electrical connections to the electrodes 2, 3 and provide a solderable surface for the leads.

After the solder operation, the capacitors are inverted and dipped in an insulating coating 21 which hermetically seals the capacitor. The capacitors are dipped to a depth indicated by a line 22 in FIGS. 1 and 2. This keeps the insulating coating clear of the leads 11, 12 so there is no coating in the critical regions which are to be soldered by the printed circuit board by solder 17, 18. At the lower end of the capacitor as shown in FIGS. 1 and 2 are inwardly inclined bevel surfaces 23 providing recesses adjacent the leads 11, 12 which insure that the leads are completely surrounded by the insulating coating 21 adjacent the lower end of the capacitor. The lower edge 24 of the capacitor which is not coated by the insulating coating 21 is spaced from the electrode edges 6 by a distance sufficient to provide the required hermetic sealing by the ceramic alone without the necessity for coverage by the insulating coating.

In order to insure that the leads 11, 12 are free of insulating coatings in the region to be soldered to the printed circuit board, the ceramic body has integral depending standoff feet 25 which space the lower edge 24 of the capacitor above the printed circuit board so that even if the capacitor were dipped to a greater depth and the lower edge 24 were covered by the insulating coating 21, the sections of the leads to be soldered to the printed circuit board would still be free of insulating coating.

We claim:

1. A capacitor having a rectangular ceramic body with upper, lower and side edges extending between front and back faces, a plurality of electrodes embedded in the body, adjacent electrodes being separated from each other by ceramic, alternate of the electrodes having extensions to one side edge of the body and the remaining electrodes having extensions to the other side edge of the body, spaced leads generally parallel to each other with upper ends respectively secured to opposite side edges and connected to the adjacent electrode extensions and with lower ends extending below said lower edge, and an insulating coating on the capacitor enclosing the portion of the body and leads above said lower edge, at least one side edge of the body being recessed inward adjacent said lower edge so the coating surrounds the lead adjacent said lower edge of the body.

2. The combination of claim 1 in which at least one side edge of the body has an inwardly and downwardly inclined bevel intersecting the lower edge and the insulating coating covers the bevel and surrounds the adjacent lead.

3. A capacitor having a rectangular ceramic body with upper, lower and side edges extending between front and back faces, a plurality of electrodes embedded in the body, adjacent electrodes being separated from each other by ceramic, alternate of the electrodes having extensions to one side edge of the body and the remaining electrodes having extensions to the other side edge of the body, spaced leads generally parallel to each other with upper ends respectively secured to opposite side edges and connected to the adjacent electrode extensions and with lower ends extending below said lower edge, said body having outwardly extending shoulders against which the upper ends of the leads abut.

4. In combination, a capacitor having a plurality of superposed generally rectangular layers of ceramic sintered into a unitary rectangular ceramic body with upper, lower and side edges extending between front and back faces, a plurality of electrodes embedded in the body, adjacent electrodes being separated from each other by a layer of ceramic, alternate of the electrodes having extensions to one side edge of the body and the remaining electrodes having extensions to the other side edge of the body, spaced leads generally parallel to each other with upper ends respectively secured to opposite side edges and connected to the adjacent electrode extensions and with lower ends extending below the lower edge, said layers having integral superposed projections sintered into unitary standoff feet integral with said body and projecting downwardly from said lower edge between the leads, said feet being adapted to support the capacitor above a supporting surface, and an insulating coating on the capacitor enclosing the portion of the body and leads above the feet whereby the leads are free of insulation which would interfere with soldering.